UNITED STATES PATENT OFFICE.

CHARLES STEARNS, OF NEW YORK, N. Y.

IMPROVED PROCESS OF PREPARING GREEN-SAND MARL AS A FERTILIZER OF LANDS.

Specification forming part of Letters Patent No. 17,237, dated May 5, 1857.

*To all whom it may concern:*

Be it known that I, CHARLES STEARNS, of New York, in the county of New York and State of New York, have invented an Improvement in the Preparation of Green-Sand-Marl Fertilizers; and I do hereby declare that the following is a full, clear, and exact description of the principle or character which distinguishes it from all other things before known, and of the usual manner of making, modifying, and using the same.

My invention consists in an improvement in preparing green-sand-marl fertilizers by concentrating their fertilizing and stimulating properties in the manner hereinafter described. Green-sand marl has long been known and used as a fertilizer; but on account of its slow action and its great bulk it has rarely ever been used at any distance from its source, on account of the expense of transportation. It has also been, in some instances, used with fish and sulphate of lime, and also with night-soil. Such cases have also occurred in the vicinity of the marl-beds; but in no instance has such combination been made or so prepared that it could be made an article of commerce. For the purpose of rendering the valuable properties of this marl available to the agricultural world I treat it as follows: The marl is first washed by agitation with water, which separates a large amount of alumina and useless earthy matters and leaves the green-sand particles containing the fertilizing matters in a pure state. After agitation, as soon as the green sand has settled, the water holding the alumina and other matters is poured off, and the washing is repeated until the green sand is clean. The green sand is then dried, pulverized or disintegrated, and mixed with animal matters—say about six hundred pounds of night-soil to one thousand of green sand and about one hundred pounds of sulphate of lime, these proportions varying of course according to the kind and condition of the animal matter.

The compound thus prepared possesses all the necessary fertilizing properties of a good manure, but lacks the stimulating property of Peruvian guano, and in order to supply this condition a suitable amount of ammonia is superadded, which operation, together with the previous pulverization or disintegration and the separation of the green sand, produces a concentrated marl or green-sand fertilizer of the highest fertilizing and stimulating quality. The ammonia may be added in the form of sulphate of ammonia, or the mass may be wet with ammoniacal liquor and subsequently dried, sufficient of sulphate of lime being used to fix the ammonia.

The sulphate of ammonia may be obtained according to methods hitherto known—viz., by the action of sulphuric acid upon urine or ammoniacal liquor of gas-works; but in whatever way it is obtained and superadded to the fertilizer, whether in solution or powder, it should be in about the proportion of seven to ten per cent. of the sulphate. More may be added, if necessary, especially if the night-soil should be deficient in ammonia from decomposition or the absence of urine. Of this condition the manufacturer must judge when the material comes to his hands. Ordinarily, however, the following may be adopted as a safe rule of action. Add twenty pounds of sulphuric acid of strength 1.625 to one barrel of thirty-two gallons of ammoniacal liquor of the gas-works, which, after the precipitation of tar and other matters, will give a little over ten gallons of strong solution of sulphate of ammonia, which will be the amount required to be mixed with the proportions of green sand and animal matters above specified.

What I claim as my improvement upon fertilizers consisting of green-sand marl and animal matters is—

Concentrating their fertilizing and stimulating properties by the previous separation of the useless matters of the marl and disintegration of the green sand and the superaddition of ammonia, substantially as herein set forth.

CHARLES STEARNS.

Witnesses:
ISAAC M. HOUSER,
G. W. COCHRAN.